Oct. 17, 1967
J. M. FEILING
3,347,295
ALMOND HULLER
Filed April 19, 1965
4 Sheets-Sheet 1
FIG_1
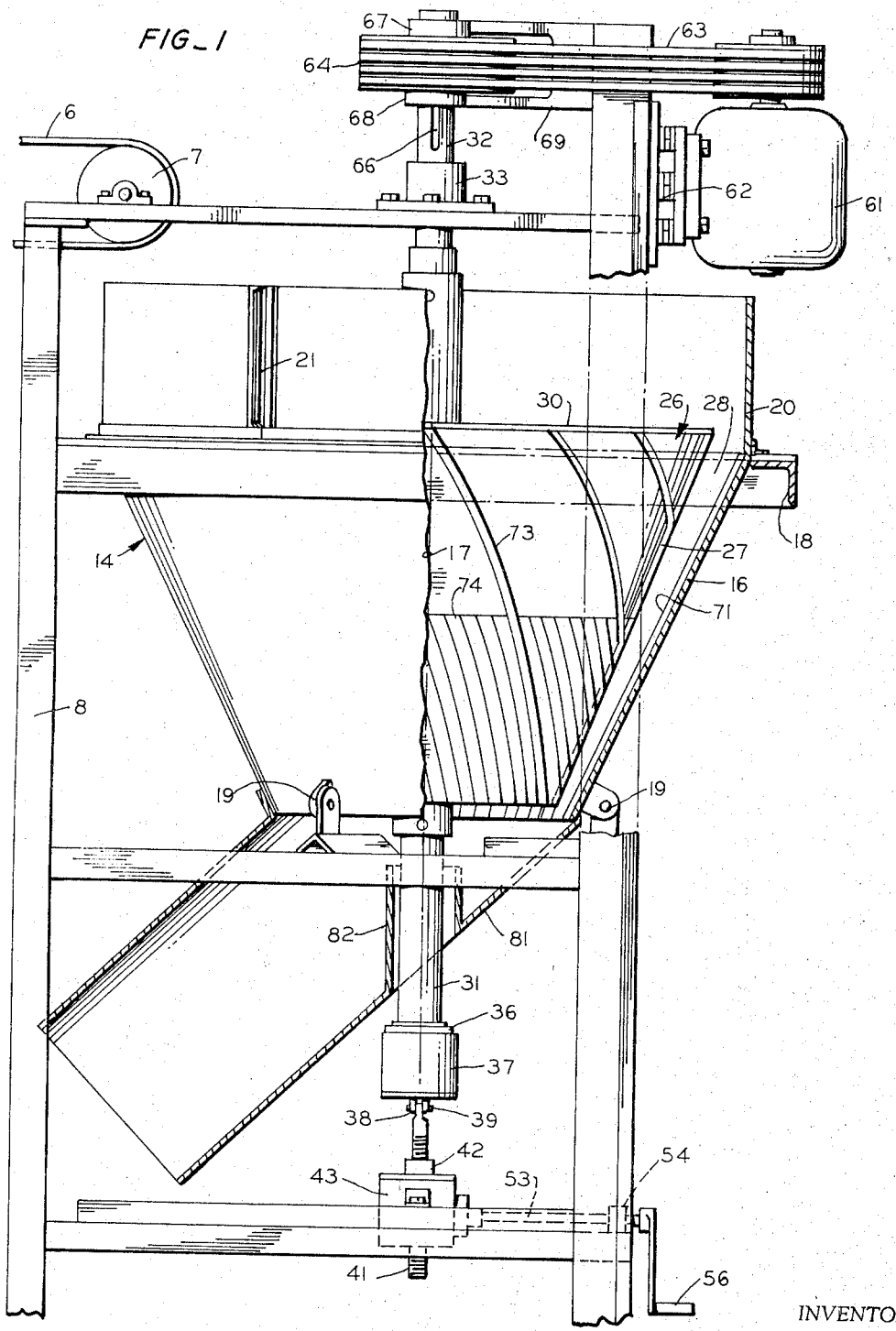
INVENTOR.
JOHN M. FEILING
BY Lothrop & West
ATTORNEYS Oct. 17, 1967            J. M. FEILING            3,347,295
ALMOND HULLER
Filed April 19, 1965            4 Sheets-Sheet 2
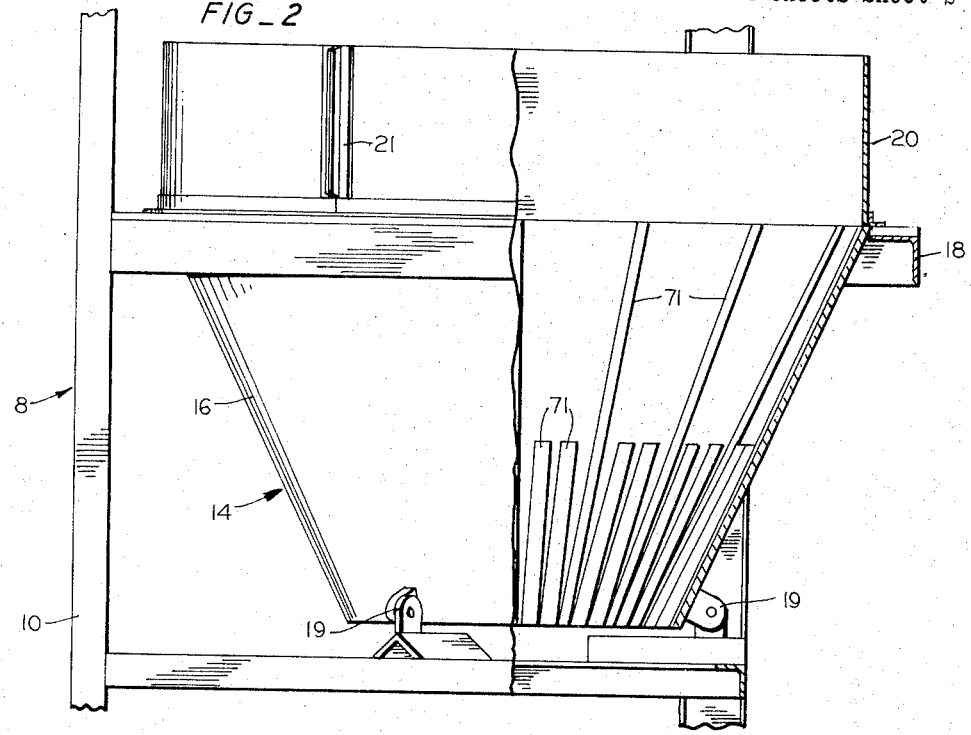
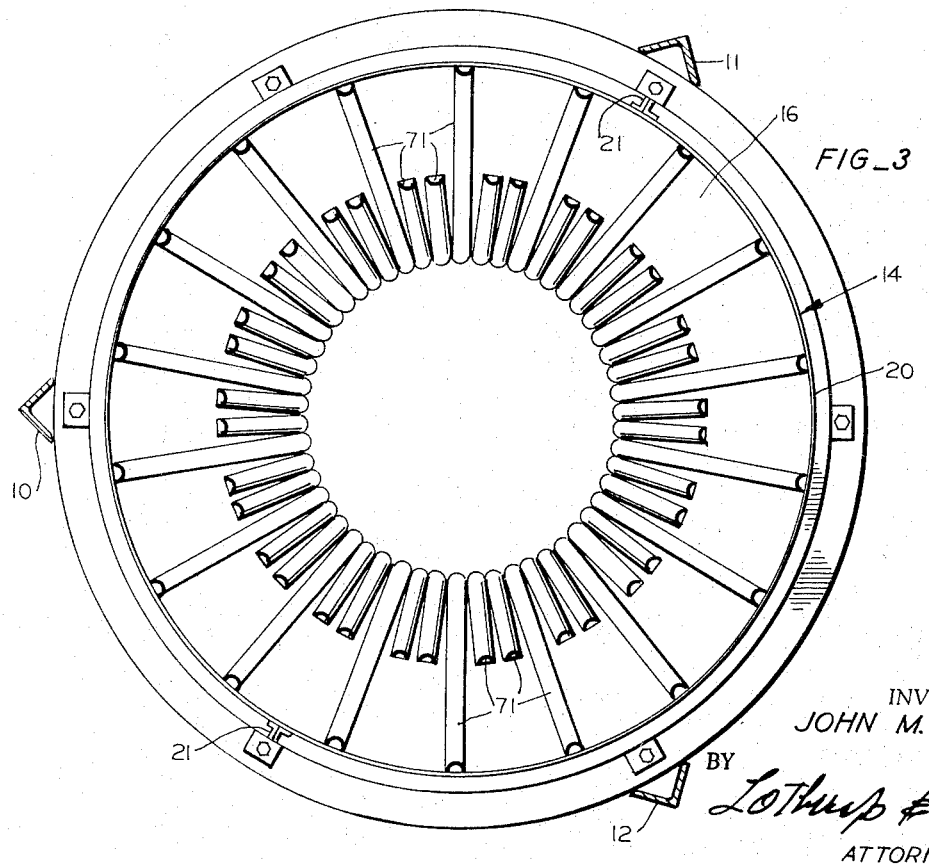
INVENTOR.
JOHN M. FEILING
BY *Lothrup & West*
ATTORNEYS Oct. 17, 1967 J. M. FEILING 3,347,295
ALMOND HULLER
Filed April 19, 1965 4 Sheets-Sheet 3
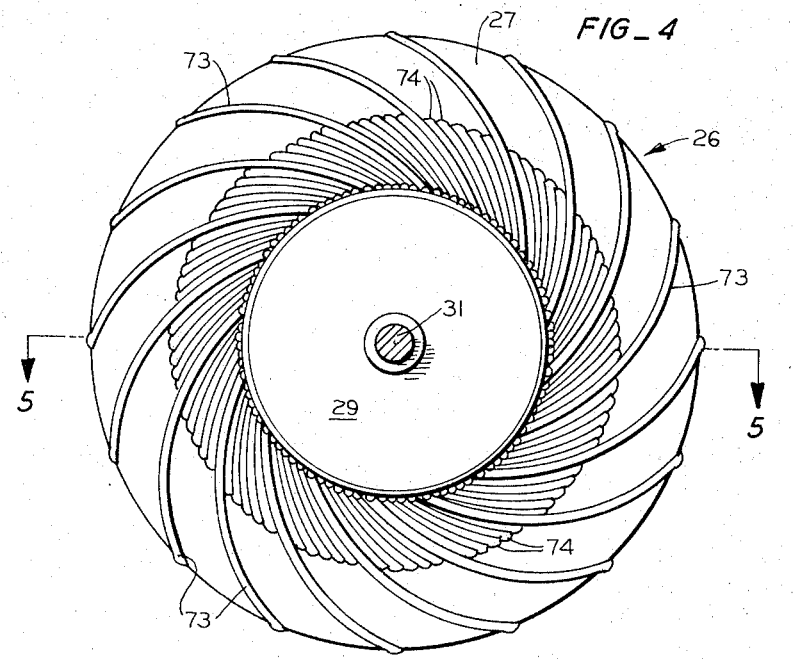
FIG_4
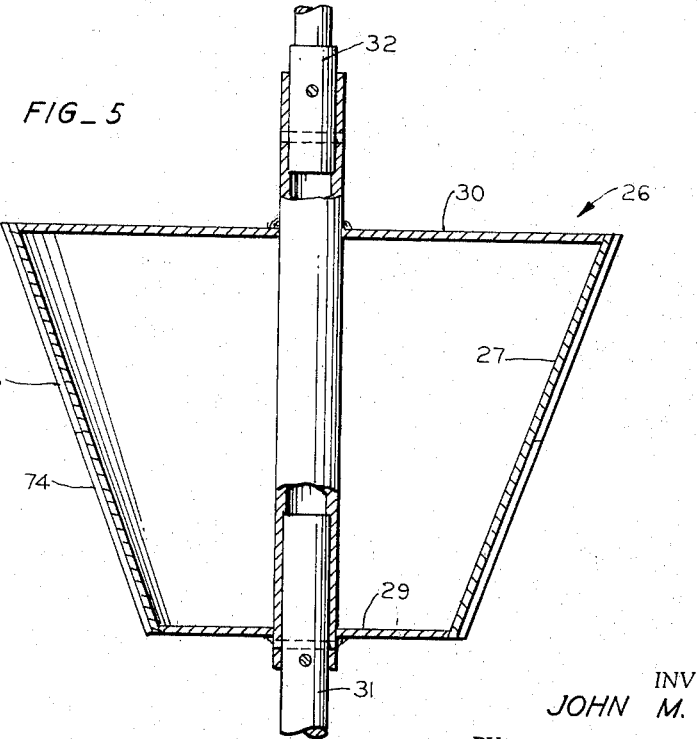
FIG_5
INVENTOR.
JOHN M. FEILING
BY Lothrop & West
ATTORNEYS

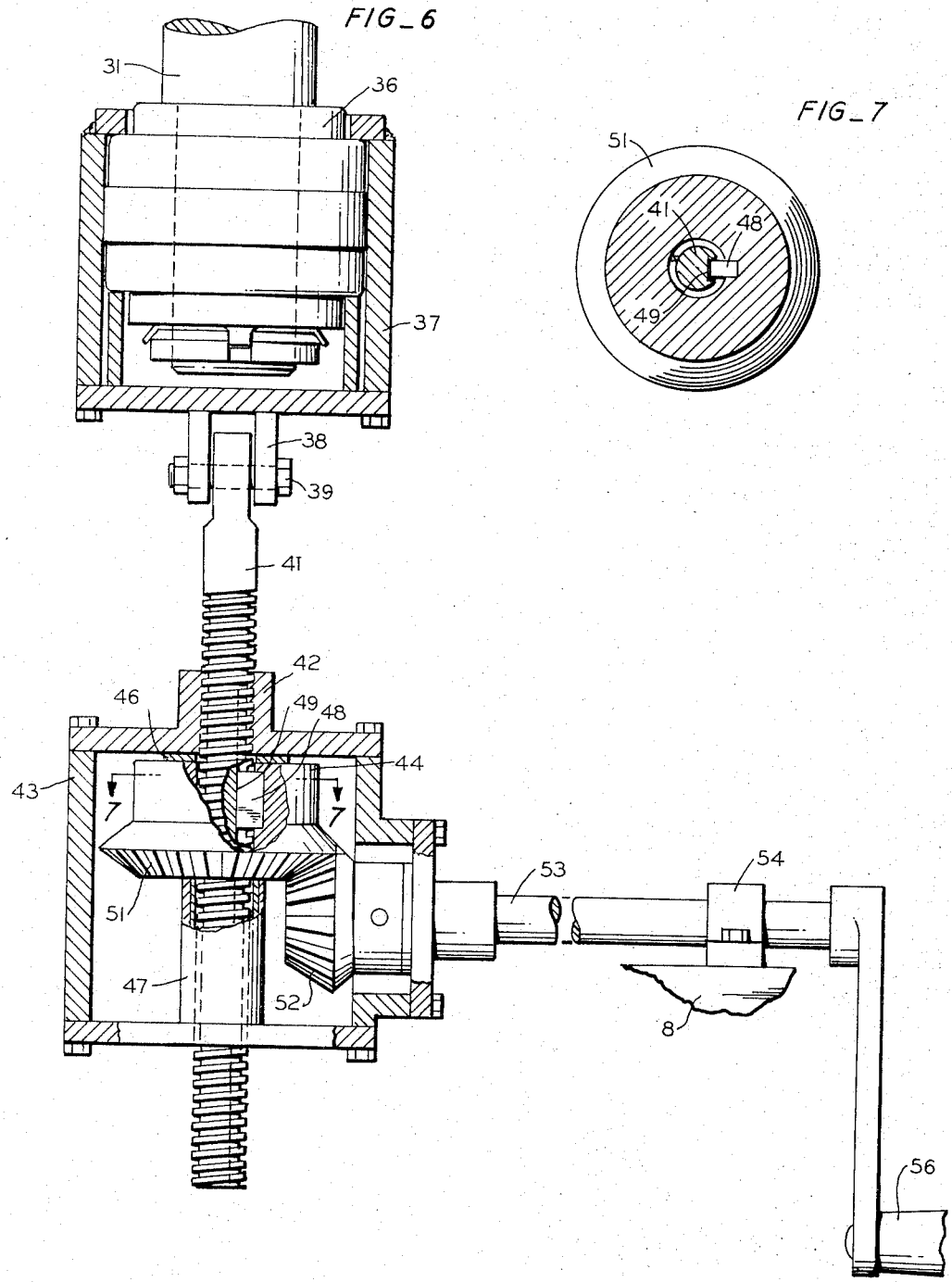

United States Patent Office 3,347,295
Patented Oct. 17, 1967

3,347,295
ALMOND HULLER
John M. Feiling, Sacramento, Calif., assignor to California Almond Growers Exchange, a non-profit California agricultural cooperative marketing corporation
Filed Apr. 19, 1965, Ser. No. 449,100
4 Claims. (Cl. 146—8)

ABSTRACT OF THE DISCLOSURE

An almond huller has a frusto-conical inner rotor rotatable coaxially within a frusto-conical outer casing, the intervening space between the rotor and casing tapering in the direction of taper of the rotor and casing. Ribs on the exterior of the rotor and ridges on the interior of the casing are rigid and rounded and project into the intervening space and are located relative to each other about widely enough to accept almond shells with attached hulls at one end and about narrowly enough to release almond shells without attached hulls at the other end.

My invention relates to means especially useful for removing the hull from an almond shell in order to make the almond merchantable.

Almonds as received from the orchard for further processing are sometimes comprised merely of the soft or hard shell with the contained nut meat, but in most instances the almonds received also include an outside hull. This is a covering mass sometimes pulpy in consistency and is sometimes relatively dry and hard, but which in most cases is largely adherent to various areas of the shell of the nut. The outside hull is deleterious in further handling of the almond, and it is desirable to remove the hull in as effective and expeditious a manner as possible. The removal need not consist in any more than the physical detachment of the hull from the shell since various segregating means to separate the detached hulls and shells are available.

It is therefore an object of the invention to provide an almond huller effective to remove or detach the hull from the shell of an almond.

Another object of the invention is to provide an almond huller which can handle a large quantity of almonds as received from the orchard and is effective in detaching the hulls from the shells in good and effective fashion.

Another object of the invention is to provide an almond huller which can be arranged to operate on almonds of various conditions, sizes and varieties as they are received from the orchard.

Another object of the invention is to provide an almond huller in which cracking of the nut shells is minimized and the detachment of the hulls from the shells is maximized.

Another object of the invention is to provide an almond huller which is power driven, yet utilizes a modest amount of power.

A still further object of the invention is to provide an almond huller readily kept in a clean and sanitary condition.

Another object of the invention is to provide an almond huller effective to operate over protracted periods with little significant wear and with little or no mechanical maintenance.

A still further object of the invention is to provide an almond huller not deleteriously affected by miscellaneous debris introduced into it with the almonds as received from the orchard.

Other objects together with the foregoing are attained in the embodiment of the invention described in the accompanying description and illustrated in the accompanying drawings, in which:

FIGURE 1 is a side elevation of an almond huller constructed pursuant to the invention, a portion of the structure being broken away to disclose the interior construction as seen on a vertical, transverse sectional plane;

FIGURE 2 is a view similar to FIGURE 1, but showing the interior of the casing with the rotor removed;

FIGURE 3 is a top plan of the structure disclosed in FIGURE 2;

FIGURE 4 is a bottom plan view of the rotor;

FIGURE 5 is a cross section, the plane of which is indicated by the line 5—5 of FIGURE 4;

FIGURE 6 is a detail showing a portion of the rotor supporting mechanism to an enlarged scale, much of the showing being in cross section on a vertical, transverse plane; and FIGURE 7 is a cross section, the plane of which is indicated by the line 7—7 of FIGURE 6.

Material received from the almond orchards is usually contained in bulk bins which hold not only the almonds with hulls attached, but also some fortuitously separate almonds shells and some separate hulls. Also, there is sometimes miscellaneous debris from the orchard, including leaves, twigs, small branches and even rocks or miscellaneous iron machine parts and the like. This material is usually deposited as it is received on a conveyor belt 6 trained around a drum 7 and appropriately driven to bring the material to the huller. The drum 7 is mounted on the main frame 8 of the huller. This frame is a partial enclosure primarily made up of three uprights 10, 11 and 12 suitably braced to each other to provide a mounting for the remaining parts of the structure.

Disposed on the frame 8 near the upper end thereof is a metal casing 14. This is made of sheet material in the form of a frusto-conical portion 16 having its relatively larger diameter uppermost and its relatively smaller diameter lowermost. The frusto-conical portion 16 is symmetrical about an axis 17 disposed vertically with respect to the frame 8. The casing 14 is fastened in place and is appropriately supported by angle members 18 and brackets 19. Supplementing the frusto-conical portion 16 of the casing is an upper, annular stiffening band 20 also supported on the angles 18 and having reinforcements 21 so that the upper portion can well withstand any vibration and impact forces.

Disposed within the casing 14 coaxially therewith is a rotor 26 of frusto-conical configuration symmetrical about an axis. In the assembly of the device the arrangement is such that the casing axis 17 and the rotor axis are coincident. The rotor 26 is formed with its side wall 27 to fit within the casing portion 16, but is at a slightly different taper or angle. The rotor is arranged with its larger diameter portion uppermost and its smaller diameter portion lowermost, so that in effect the rotor and the casing are approximately nested, yet with a downwardly narrowing clearance space 28 therebetween.

In order properly to support the frusto-conical rotor and particularly to support the rotor for rotation about the axis 17 and also for translational movement in a vertical direction, the rotor 26 is connected by plates 29 at its lower end and 30 at its upper end to aligned shafts 31 and 32 on the axis 17. The shaft 32 passes through a support bearing 33 mounted on a portion of the frame 8. The shaft 31 at its lower end carries an antifriction bearing 36 (FIGURE 6) not only fastened onto the shaft 31 but confined within a cage 37. Thus, the shaft 31 is freely rotatable about the axis 17 relative to the cage 37 but is axially fixed in the cage.

At its lower end the cage has a pair of ears 38 connected by a pivot pin 39 to the upper end of a screw shaft 41. The screw shaft 41 has threaded engagement with the cover hub 42 of a housing 43 fixed on the lower portion of the frame 8. Within the housing 43 is disposed a rotatable collar 44 held in axial position by a thrust washer 46 and a thrust sleeve 47. The collar 44 carries an interior key 48 adapted to operate in a keyway 49 cut in the screw shaft 41.

Integral with the collar 44 is a bevel gear 51 meshing with a bevel pinion 52 fixed on the end of an operating shaft 53 journalled in the side wall of the housing 43. The shaft 53 is likewise supported by a bearing block 54 on the frame 8 and can be revolved in either direction by a hand crank 56. When the hand crank is turned, the pinion 52 rotates the bevel gear 51 and through the key 48 revolves the screw shaft 41. The shaft, being threadedly engaged with the cover hub 42, is not only rotated but is also translated axially. This rotates and lifts or lowers the cage 37 and through the bearing 36 similarly lifts and lowers the connected shafts 31 and 32 with the rotor 26. In this fashion, the exterior wall of the rotor by being lifted or lowered can be radially positioned any desired distance from the interior of the casing wall. This permits the operator to choose the dimensions of the space 28 between the rotor and casing and thus to accommodate the individual characteristics of the almond load being processed.

Mounted on the frame 8 in a convenient location is an electric motor 61 having an adjusting support 62 and effective to drive belts 63 engaging a pulley 64 on the upper end of the shaft 32. If the vertical translation of the shaft 32 is not very great and the motor is spaced some long distance from the shaft, then the pulley 64 can be fixed on the shaft 32, as the shaft movement does not then produce substantial deflection of the belts. If, however, substantial axial movement is required, then it is preferred that the pulley 64 be provided with a key (not shown) engaging a keyway 66 in the upper end of the shaft 32 so that rotational movement is transmitted but so that the pulley does not translate with the shaft, being held between bearings 67 and 68 carried by a bracket 69 forming part of the frame 8.

With the machine so as far described, the unhulled almonds and accompanying material as received from the orchard are discharged over the end of the belt 6 and over the drum 7 onto the relatively flat upper plate 30 as it is revolved by the motor 61. The revolving plate acts as a distributor and carries the received material in circular and radial directions, carrying it to spill evenly over the edge of the upper portion of the frusto-conical rotor. This material is also confined by the annular wall 20 and falls by gravity into the relatively large space 28 at distributed points around the rotor periphery.

There is abrasion upon the materials between the relatively stationary casing wall and the relatively rotating rotor wall so that the tendency is to abrade or rub the hull from the almond shell.

Particularly to augment and assist this removing action, the interior of the casing is provided with a number of ribs 71 arranged along the elements of the cone of which the casing is a frustum. The ribs are conveniently made of half-round, metal strips secured to the interior face of the casing. The ribs are spaced relatively far apart near the upper end of the casing, but beginning at a point about halfway down the casing, particularly as shown in FIGURE 2, the ribs are augmented by additional, shorter ribs so that near the bottom of the casing the undulatory configuration provided by all of the ribs is substantially continuous.

Somewhat similarly, the exterior surface of the rotor is likewise provided with a number of long ridges 73 which are spaced relatively far apart near the upper portion of the rotor. These ridges 73 are not placed in the position of conical elements, but rather are in a spiral or helical configuration so that they act in effect as screw members tending to drive or propel the almonds downwardly. Also on the rotor the ridges 73 are augmented on substantially the lower half by the provision of additional shorter ridges 74. All of the ridges are approximately half-round, metal members and are so arranged that they are virtually continuous at the bottom of the rotor, affording an undulatory configuration.

As the rotor revolves against the materials within the space 28, the ribs and ridges not only encounter the hulls, but tend to abrade or macerate them and to remove them and detach them from the almond shells. As the almonds are impelled downwardly not only by gravity but also by the screw motion of the ridges 73 and 74, they are turned and tumbled and engaged on all sides, so that the hulls are stripped or rubbed from the shells. Conveniently and preferably, the radial dimension of the space 28 is adjusted by appropriate rotation of the crank 56 so that the shells, devoid of hulls, can readily be discharged from the bottom of the space between the undulatory ribs and ridges without substantial damage or cracking. On the other hand, the hulls themselves are torn off and macerated and comminuted and in most instances form rather a pulpy discharge at the bottom of the space 28.

To receive the material which has been treated in the huller, the lower end of the casing portion 16 opens into a discharge duct 81. This is a conduit supported on the frame 8 and leading off to one side where appropriate conveying machinery (not shown) can carry the removed hulls and the separated shells from the machine. A tubular guard 82 surrounds the shaft 31 to isolate the shaft from the passing material.

In the operation of this machine on large quantities of materials as received from the orchard, it has been found that deleterious material such as twigs, leaves, small rocks, iron fragments or the like can pass through the machine without substantial damage, but that the hulls, whether relatively dry or relatively moist, are stripped from the almond shells. The shells themselves work their way downwardly between the ribs and ridges, tending to accommodate themselves to the depressions between these parts, so that they are treated without substantial damage. The adjustment of the machine by the rotation of the crank 56 permits the device to operate on relatively small-shelled almonds and relatively large-shelled varieties as well. Also, the machine can be set to accommodate the particular condition of moisture of the hulls and also the nature of the almonds, that is to say, whether they are soft shell or hard shell.

At the conclusion of a run, the rotor can be well separated from the casing by operating of the crank 56, the entire interior of the machine then being easily available for ready flushing and cleaning before subsequent use.

What is claimed is:

1. An almond huller for removing the relatively soft outer hulls from the relatively hard inner shells of almonds comprising a frame, a shaft, means for mounting said shaft on said frame to turn about a vertical axis, a rigid frusto-conical outer casing, means for mounting said outer casing on said frame surrounding and substantially coaxially disposed with respect to said shaft, a plurality of internally projecting rigid rounded ribs on the interior wall of said outer casing, a rigid frusto-conical inner rotor of less abrupt taper than said outer casing, means for mounting said inner casing on said shaft coaxially therewith, a plurality of externally projecting rigid rounded ribs on the exterior wall of said inner rotor, and means for locating said inner rotor axially relative to said outer casing in positions in which the radial space therebetween at one end is approximately the size of said almond shells with said hulls thereon and at the other end is approximately the size of said almond shells without said hulls thereon.

2. An almond huller as in claim 1 in which said rounded ribs and ridges are substantially half-round in cross section normal to said axis.

3. An almond huller as in claim 1 in which the large ends of said outer casing and said inner rotor are uppermost and a flat distributing disc closes the upper end of said inner rotor.

4. An almond huller as in claim 2 in which said rounded ribs are substantially immediately adjacent each other at the small end of said inner rotor and said rounded ridges are substantially immediately adjacent each other at the small end of said outer casing.

References Cited

UNITED STATES PATENTS

| | | | |
|---|---|---|---|
| 249,110 | 11/1881 | Shafer | 241—259 |
| 313,989 | 3/1885 | Burckhardt | 146—300 X |
| 567,372 | 9/1896 | Beach | 146—8 |
| 669,735 | 3/1901 | Rider | 146—305 X |
| 831,663 | 9/1906 | Grohens | 146—32 |
| 1,794,972 | 3/1931 | Mayer | 241—293 X |

W. GRAYDON ABERCROMBIE, *Primary Examiner.*